(12) United States Patent
Matsuda et al.

(10) Patent No.: US 12,409,909 B2
(45) Date of Patent: Sep. 9, 2025

(54) STRADDLE VEHICLE

(71) Applicant: KAWASAKI MOTORS, LTD., Akashi (JP)

(72) Inventors: Yoshimoto Matsuda, Akashi (JP); Kohei Akita, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/581,903

(22) Filed: Feb. 20, 2024

(65) Prior Publication Data

US 2024/0409184 A1    Dec. 12, 2024

(30) Foreign Application Priority Data

Feb. 20, 2023  (JP) ................. 2023-024190

(51) Int. Cl.
*B60K 13/00*    (2006.01)
*B60K 13/02*    (2006.01)
(Continued)

(52) U.S. Cl.
CPC ............ B62M 7/04 (2013.01); B62J 35/00 (2013.01); B62K 5/027 (2013.01); *B60K 13/00* (2013.01);
(Continued)

(58) Field of Classification Search
CPC .......... B62J 35/00; B62J 37/00; B62K 5/027; B62K 11/10; B62K 11/12; B62M 7/04; B60K 13/00; B60K 13/02; B60K 13/04; B60K 15/00; B60K 15/01; B60K 15/013; B60K 15/03; B60K 15/03006; B60K 2015/03032; B60K 2015/03059;
(Continued)

(56) References Cited

U.S. PATENT DOCUMENTS 7,232,014 B2   6/2007   Nakaie
8,752,661 B2   6/2014   Nagura et al.
(Continued)

FOREIGN PATENT DOCUMENTS

CN     112441169       3/2021
EP     2604496 A1 *    6/2013    ............ B60L 1/003
(Continued)

OTHER PUBLICATIONS

Description translation for EP 2604496 from Espacenet (Year: 2013).*
(Continued)

*Primary Examiner* — Jason D Shanske
*Assistant Examiner* — Daniel M. Keck
(74) *Attorney, Agent, or Firm* — Fay Kaplun & Marcin, LLP

(57) ABSTRACT

The straddle vehicle includes a front wheel, a rear wheel, at least one tank, an internal combustion engine, a seat, and a steering handle. The front wheel is a steering wheel. The rear wheel is a drive wheel arranged located rearward of the front wheel. The tank is configured to be filled with a gaseous fuel. The internal combustion engine generates power using gaseous fuel filled in the tank. The driver sits on the seat. The driver performs the steering operation to the steering handle. The center of gravity of the tank is located closer to the steering wheel with respect to the center of gravity of the internal combustion engine.

12 Claims, 6 Drawing Sheets

(51) Int. Cl.

| | |
|---|---|
| *B60K 13/04* | (2006.01) |
| *B60K 15/00* | (2006.01) |
| *B60K 15/01* | (2006.01) |
| *B60K 15/03* | (2006.01) |
| *B62J 35/00* | (2006.01) |
| *B62J 37/00* | (2006.01) |
| *B62K 5/027* | (2013.01) |
| *B62K 11/04* | (2006.01) |
| *B62K 11/10* | (2006.01) |
| *B62K 11/12* | (2006.01) |
| *B62M 7/04* | (2006.01) |

(52) U.S. Cl.
CPC .............. *B60K 13/02* (2013.01); *B60K 13/04* (2013.01); *B60K 15/00* (2013.01); *B60K 15/01* (2013.01); *B60K 15/013* (2013.01); *B60K 15/03* (2013.01); *B60K 15/03006* (2013.01); *B60K 2015/03032* (2013.01); *B60K 2015/03059* (2013.01); *B60K 2015/03118* (2013.01); *B60K 2015/03157* (2013.01); *B60K 2015/03164* (2013.01); *B62J 37/00* (2013.01); *B62K 11/10* (2013.01); *B62K 11/12* (2013.01)

(58) Field of Classification Search
CPC ......... B60K 2015/003118; B60K 2015/03157; B60K 2015/03164
See application file for complete search history.

(56) References Cited

U.S. PATENT DOCUMENTS

| | | | |
|---|---|---|---|
| 11,247,743 B2 * | 2/2022 | Domenech | B60K 15/013 |
| 2010/0252554 A1 * | 10/2010 | Eguchi | B62J 37/00 220/86.2 |
| 2013/0233633 A1 | 9/2013 | Matsuda | |
| 2014/0060955 A1 * | 3/2014 | Kono | B62K 11/00 180/291 |
| 2014/0353061 A1 * | 12/2014 | Iida | B62K 11/04 180/220 |

FOREIGN PATENT DOCUMENTS

| | | | | |
|---|---|---|---|---|
| EP | 2871121 | | 11/2013 | |
| EP | 3647173 | | 5/2020 | |
| EP | 3971070 | | 9/2020 | |
| EP | 3497003 B1 * | | 10/2021 | ....... B60K 15/03006 |
| EP | 4385867 A1 * | | 6/2024 | .............. B62J 35/00 |
| FR | 3103146 A1 * | | 5/2021 | .............. B62J 35/00 |
| JP | 2005104243 A * | | 4/2005 | |
| JP | 2010036791 A * | | 2/2010 | ............. B62K 5/027 |
| JP | 2011195095 A * | | 10/2011 | |
| WO | 2012/066598 | | 5/2012 | |
| WO | WO-2013094074 A1 * | | 6/2013 | .............. B62J 35/00 |

OTHER PUBLICATIONS

Description translation for WO 2013/094074 from Espacenet (Year: 2013).*
Description Translation for FR 3103146 (Year: 2021).*

* cited by examiner

First Embodiment

| ● | center of gravity of tank(s) |
| ■ | center of gravity of internal combustion engine |
| ▲ | center of gravity of vehicle |

First Embodiment

Second Embodiment

| ● | center of gravity of tank(s) |
| ■ | center of gravity of internal combustion engine |
| ▲ | center of gravity of vehicle |

Third Embodiment

| ● | center of gravity of tank(s) |
| ■ | center of gravity of internal combustion engine |
| ▲ | center of gravity of vehicle |

Fourth Embodiment

| ● | center of gravity of tank(s) |
| ■ | center of gravity of internal combustion engine |
| ▲ | center of gravity of vehicle |

Fourth Embodiment

STRADDLE VEHICLE

FIELD

The present disclosure relates to a straddle vehicle including an internal combustion engine that uses gaseous fuel to generate power.

BACKGROUND INFORMATION

PTL 1 is PCT Publication Appln. No. WO2012/066598.

PTL 1 discloses an electric two-wheeled vehicle. The electric two-wheeled vehicle of PTL 1 includes a battery case in which a battery is housed, and a motor driven by electric energy stored in the battery. The battery case, which is a heavy object, is located relatively forward in order to suppress wheelies, front wheel floatation, and front wheel slippage. In detail, referring to line A2, which indicates the midpoint between the center of the front wheels and the center of the rear wheels in the front-rear direction, the portion of the battery case that occupies more forward than line A2 is larger than the portion of the battery case that occupies more rearward than line A2.

SUMMARY

The electric vehicle of PTL 1 does not include an internal combustion engine that uses gaseous fuel to generate power. Therefore, PTL 1 does not disclose an appropriate layout for a tank filled with gaseous fuel. In addition, depending on the location of the tank, the installation load on the steering wheel may be lower.

The present disclosure has been made in view of the above circumstances, and its main objective is to locate a tank filled with gaseous fuel in a position where the installation load on the steering wheel is high, for a straddle vehicle including an internal combustion engine that ues gaseous fuel to generate power.

According to the present disclosure, provided is a straddle vehicle having the following configuration.

The straddle vehicle includes a front wheel, a rear wheel, a tank, an internal combustion engine, a seat, and a steering handle. The front wheel is a steering wheel. The rear wheel is a drive wheel located rearward of the front wheel. The tank is filled with gaseous fuel. The internal combustion engine generates power using the gaseous fuel filled in the tank. A driver sits on the seat. The driver performs a steering operation on the steering handle. A center of gravity of the tank is located closer to the steering wheel with respect to a center of gravity of the internal combustion engine.

According to the present disclosure, for a straddle vehicle including an internal combustion engine that generates power using gaseous fuel, the tank filled with gaseous fuel is located at a position where the installation load on the steering wheel is higher.

DETAILED DESCRIPTION

Configuration of the First Exemplary Embodiment

Figure 1:
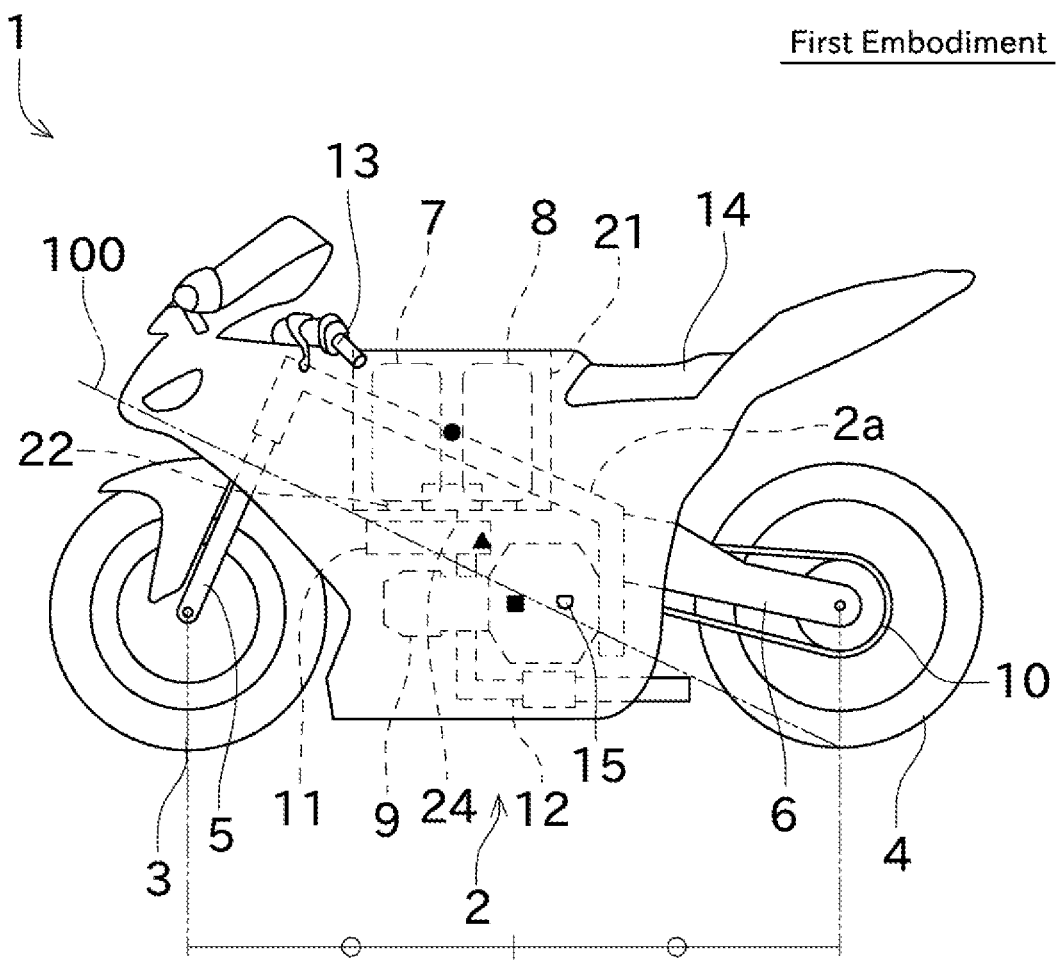
FIG. 1 is a side view of a first embodiment of a straddle vehicle.
Figure 2:
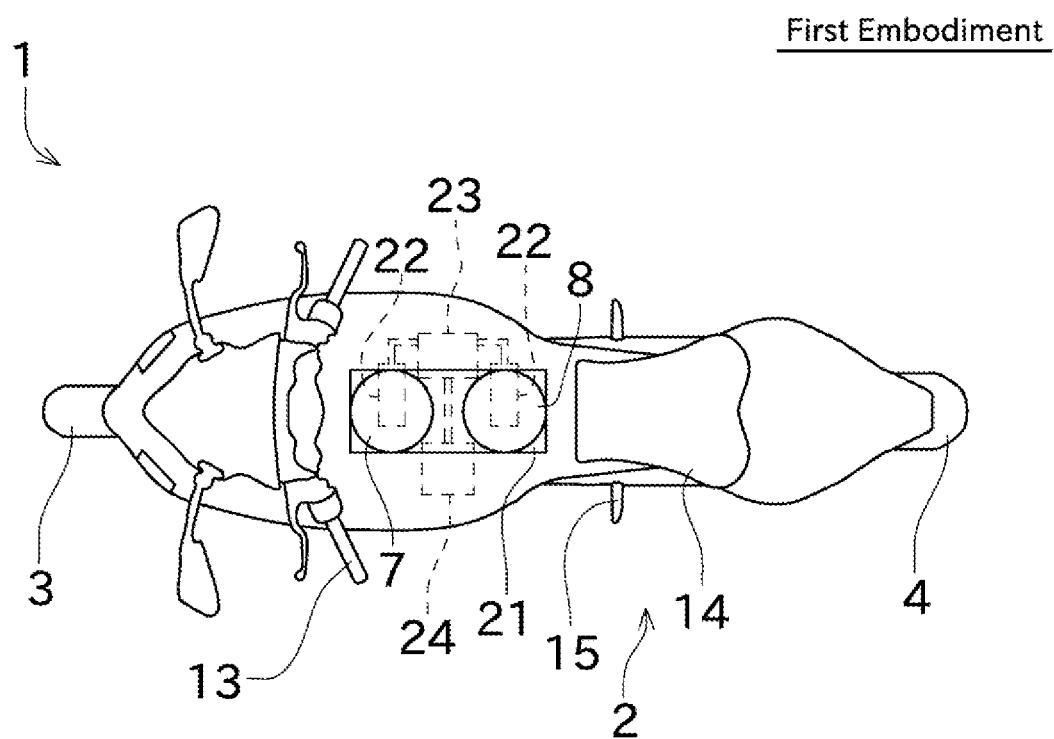
FIG. 2 is a plan view of the first embodiment of the straddle vehicle.

Exemplary embodiments of the present disclosure will be described with reference to the above drawings. First, with reference to FIG. 1 and FIG. 2, a first embodiment of a straddle vehicle 1 will be described. FIG. 1 is a side view of the first embodiment of the straddle vehicle 1. FIG. 2 is a plan view of the first embodiment of the straddle vehicle 1.

In the following description, the left and right directions of the straddle vehicle 1 are defined as the direction viewed from a driver riding in the straddle vehicle 1. Therefore, a front-back direction corresponds to a vehicle length direction, and a left-right direction corresponds to a vehicle width direction. A vertical direction and an upper/lower direction correspond to a height direction. As shown in FIG. 1, the straddle vehicle 1 includes a vehicle body 2, a front wheel 3, and a rear wheel 4. The front wheel 3 and the rear wheel 4 are spaced apart in the vehicle length direction.

The straddle vehicle 1 is a passenger-type vehicle. In particular, the straddle vehicle 1 is a type of vehicle in which the driver rides astride. The straddle vehicle 1 may be a vehicle for transportation purposes or a leisure vehicle for leisure purposes.

The vehicle body 2 includes a plurality of frames 2a that serve as the framework of the straddle vehicle 1. Various components of the straddle vehicle 1 are mounted to the frames 2a. The front wheel 3 is mounted to the frame 2a via a front fork 5. The rear wheel 4 is mounted to the frame 2a via swing arm 6. The swing arm 6 supports the rear wheel 4 rockingly. Furthermore, a first tank 7 and a second tank 8 and an internal combustion engine 9 are mounted to the frame 2a. In the first embodiment, the swing arm 6 and the internal combustion engine 9 are separate and connected via the frame 2a.

The first tank 7 and the second tank 8 are containers that stores gaseous fuel. The gaseous fuel in the first embodiment is hydrogen. The gaseous fuel is not limited to hydrogen and may be natural gas, for example. The gaseous fuel is filled into the first tank 7 and the second tank 8 at a pressure higher than atmospheric pressure. Therefore, the first tank 7 and the second tank 8 tend to be heavy because the first tank 7 and the second tank 8 are required to be high pressure resistance. Two tanks are provided with the straddle vehicle 1. Alternatively, one or more than two tanks may be provided in the straddle vehicle 1.

The first tank 7 and the second tank 8 are removable. In detail, the straddle vehicle 1 includes an container 21. The container 21 includes space to accommodate the first tank 7 and the second tank 8. The container 21 can hold and release the first tank 7 and the second tank 8 that are accommodated in the container 21. For example, when refilling the first tank 7 and the second tank 8 with gaseous fuel, the first tank 7 and the second tank 8 are removed from the container 21.

As shown in FIG. 2, the first tank 7 and second tank 8 are surrounded by a mounting 22, a pressure reducing valve 23, and a shut-off valve 24.

The mounting 22 is provided for the first tank 7 and the second tank 8, respectively. Gas supply port is provided at the bottom of each of the first tank 7 and the second tank 8, and each mounting 22 has a mounting port for attaching the gas supply port. The pressure reducing valve 23 is located downstream of each the mounting 22 in the gaseous fuel flow direction.

The pressure reducing valve 23 reduces the pressure of the gaseous fuel supplied from the first tank 7 and the second tank 8. In the first embodiment, one pressure reducing valve 23 is provided, and one pressure reducing valve 23 reduces the pressure of the gaseous fuel in the first tank 7 and the second tank 8. The pressure reducing valves 23 may be provided for each of the first tank 7 and the second tank 8. The shut-off valve 24 is located downstream of each of the pressure reducing valves 23 in the gaseous fuel flow direction.

The shut-off valve 24 is switchable between an open state in which the gaseous fuel supplied from the pressure reducing valve 23 flows downstream and a shut-off state in which the gaseous fuel supplied from the pressure reducing valve 23 is shut off. Specifically, the shut-off valve 24 is a solenoid valve, which switches between the open state and the shut-off state by opening and closing the valve in response to an external signal. Normally, the shut-off valve 24 is in the open state, and when an abnormality occurs, the shut-off valve 24 is closed in response to an external signal. The gaseous fuel that passes through the shut-off valve 24 flows toward the internal combustion engine 9.

As the pressure reducing valve 23 and shut-off valve 24 are valves that reduce or shut off the pressure of the gaseous fuel, the pressure reducing valve 23 and shut-off valve 24 correspond to "regulating valves". The pressure reducing valve 23 and shut-off valve 24 are not essential configurations and can be omitted.

An intake structure 11 is a structure that supplies intake air to the internal combustion engine 9. Specifically, the intake structure 11 has an air cleaner box and an intake pipe. The air cleaner box removes dust and other particles contained in the intake air. The intake air purified by the air cleaner box flows through the intake pipe toward the internal combustion engine 9. If the internal combustion engine 9 has multiple cylinders, the intake structure 11 is further provided with an intake manifold.

The internal combustion engine 9 generates power using gaseous fuel. In detail, the internal combustion engine 9 includes a cylinder case and a crankcase. A mixture of gaseous fuel and intake air is supplied to the cylinder in the cylinder case. When the mixture in the cylinder is compressed and the mixture is ignited, the piston moves in a linear motion. The linear motion of the piston is converted into rotational motion by a connecting rod and transmitted to a crankshaft. The crankshaft and the transmission gear are accommodated in the crankcase. In the first embodiment, the transmission gear is provided as part of the internal combustion engine 9. Alternatively, the transmission gear may be provided separately from the internal combustion engine 9. The power generated in the above manner is transmitted to the rear wheel 4, which is the drive wheel, via a drive chain 10. The transmission of drive from the internal combustion engine 9 to the rear wheel 4 is not limited to the drive chain 10, but may also use a belt or shaft. In addition to the rear wheel 4, the front wheel 3 may be the drive wheel.

An exhaust structure 12 is a structure that exhausts exhaust air generated by combustion in the internal combustion engine 9. The exhaust structure 12 includes an exhaust pipe and a catalyzer. The exhaust air generated by the internal combustion engine 9 flows through the exhaust pipe to the catalyzer. The catalyzer has an area where a catalyst is arranged to reduce the concentration of nitrogen oxides generated by air combustion. The concentration of nitrogen oxides is reduced when the exhaust air passes through the catalyzer. The exhaust air that has passed through the catalyzer is exhausted to the outside. If the internal combustion engine 9 has multiple cylinders, the exhaust structure 12 is further provided with an exhaust manifold.

At the front of the vehicle body 2, the front fork 5 and a steering handle 13 are provided. The front forks 5 are arranged in pairs on either side so as to sandwich the front wheel 3 in the front view. The steering handle 13 is connected to the upper end of the front fork 5. The front forks 5 is rotated by performing a steering operation which is an operation of rotating the steering handle 13 by the driver. This allows the straddle vehicle 1 to turn. The straddle vehicle 1 is a lean type vehicle in which the vehicle body 2 is inclined toward the center of the turn with respect to the road surface when turning.

The straddle vehicle 1 further includes a seat 14 and a step 15. The driver sits on the seat 14 and places his/her foot on the step 15 which is bar-shaped arranged on the side of the vehicle body 2. In this way, the driver rides astride the seat 14, so the straddle vehicle 1 is a straddle-type. In particular, the straddle vehicle 1 of the first embodiment is a sports type vehicle. The sports type vehicle is a type of vehicle in which the driver puts his/her foot on the bar-shaped step 15 and the position of the step 15 in the vehicle length direction overlaps with the seat 14, so that the driver tends to lean forward.

The straddle vehicle 1 of the first embodiment has the above-described configuration, and can be modified to above-described another configuration. The explanation is not limited to the straddle vehicle 1 of the first embodiment, but also apply to the straddle vehicles 1 of the second to fourth embodiments described below, unless otherwise specified.

<Configuration of Second and Third Embodiments>

Figure 3:
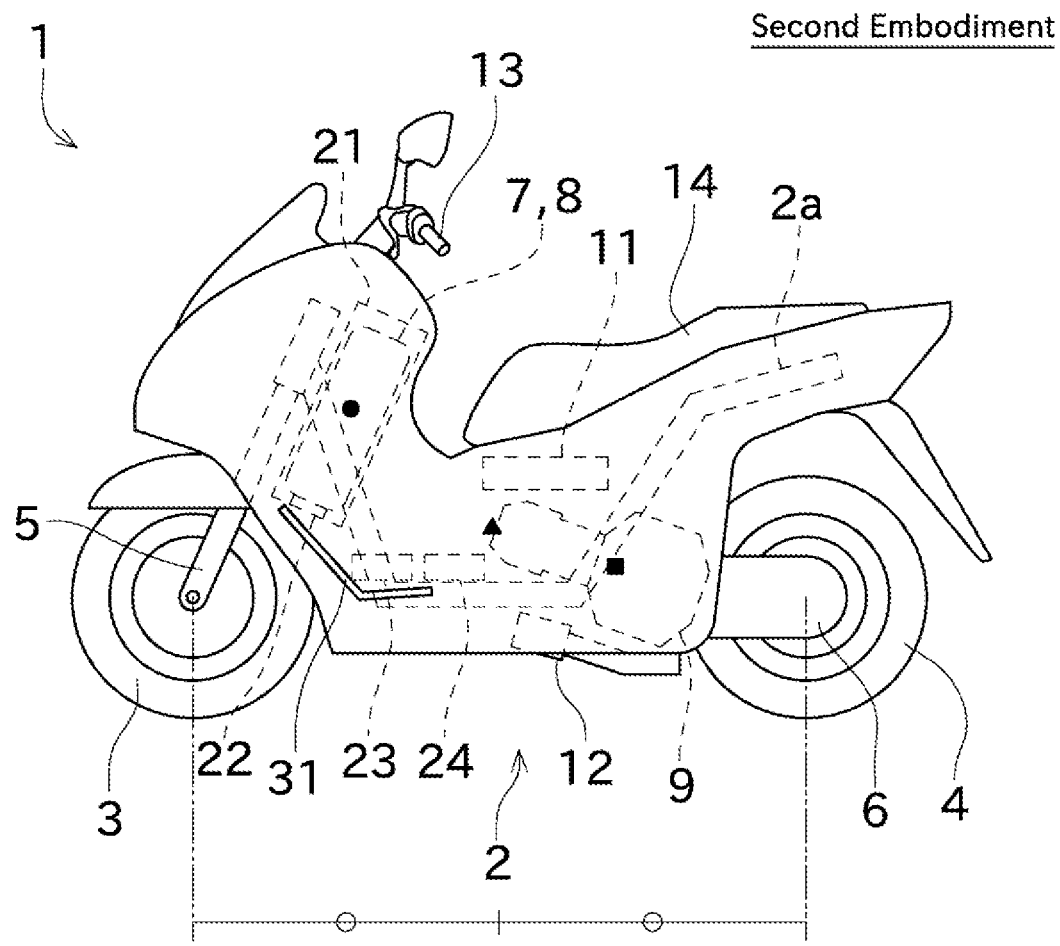
FIG. 3 is a side view of a second embodiment of the straddle vehicle.
Figure 4:
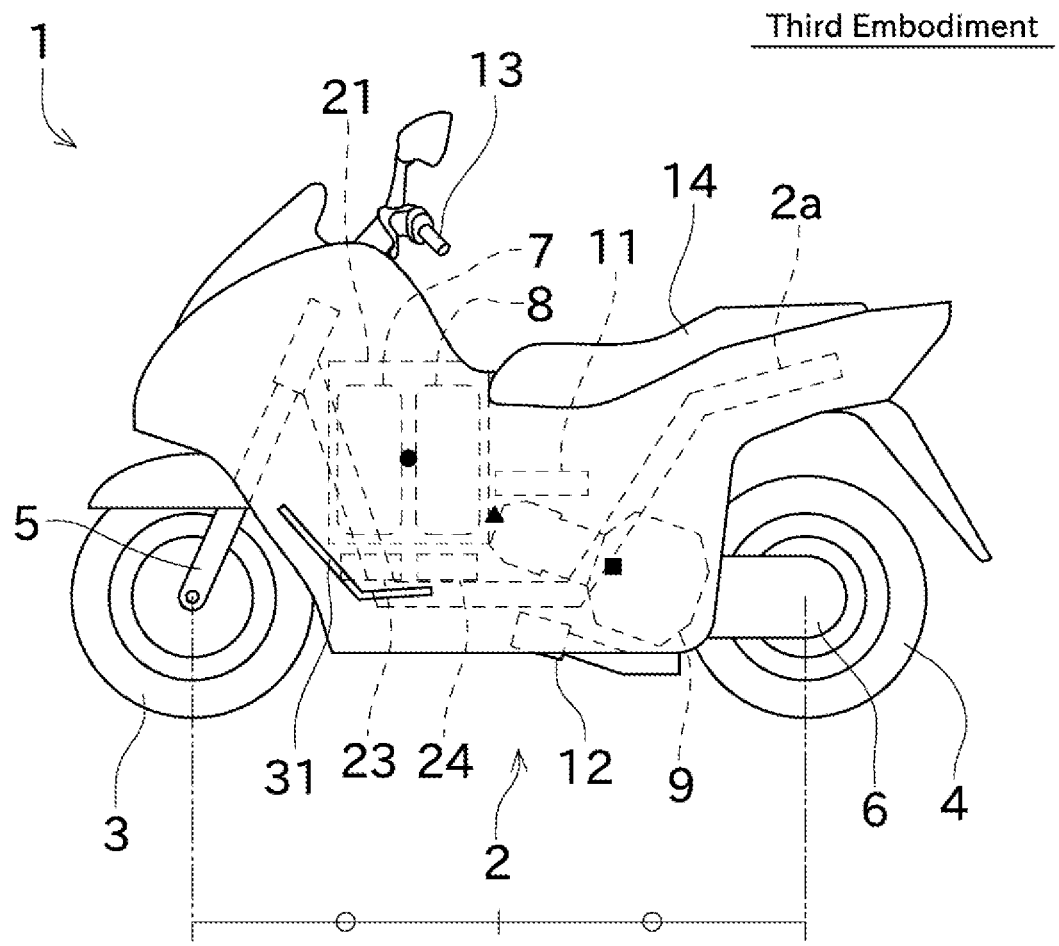
FIG. 4 is a side view of a third embodiment of the straddle vehicle.

Next, the configuration of the straddle vehicle 1 of the second embodiment will be described with reference to FIG. 3. FIG. 3 is a side view of the straddle vehicle 1 of the second embodiment.

The straddle vehicle 1 of the second embodiment is a scooter type vehicle. The scooter type is a type of vehicle that has a floor plate for placing feet of the driver, and the floor plate is located in front of the seat 14, so that the driver is less likely to lean forward. In the straddle vehicle 1 of the second embodiment, a pair of left and right footrests 31 provided on both sides of the vehicle body 2 correspond to a floor plate. Note that instead of the pair of left and right footrests 31, one floor may be provided. The floor extends left and right from a center position in the vehicle width direction, and is a part where the driver's feet or luggage can be placed.

The driver straddles the vehicle body 2 and places his/her left and right feet on the pair of left and right footrests 31, respectively. Therefore, the straddle vehicle 1 of the second embodiment is a straddle type. Even if a floor is provided instead of the footrest 31, the driver is in a riding posture similar to that of a driver riding in the straddle vehicle 1 of the second embodiment, thus such vehicle is also straddle type. That is, in this description, a scooter type vehicle corresponds to a straddle vehicle. Similarly to the first embodiment, the straddle vehicle 1 is a lean type vehicle in which the vehicle body 2 is inclined toward the center of the turn with respect to the road surface when turning.

The straddle vehicle 1 of the second embodiment is a swing unit type, and the swing arm 6 and the internal combustion engine 9 are integrally configured. In other words, the swing arm 6 is directly attached to the internal combustion engine 9. The straddle vehicle 1 of the second embodiment has a belt-type CVT, and the CVT is used for changing gears.

The straddle vehicle 1 of the third embodiment has the same configuration as the straddle vehicle 1 of the second embodiment, except that the layout of the first tank 7 and the second tank 8 is different, as will be described later.

Figure 5:
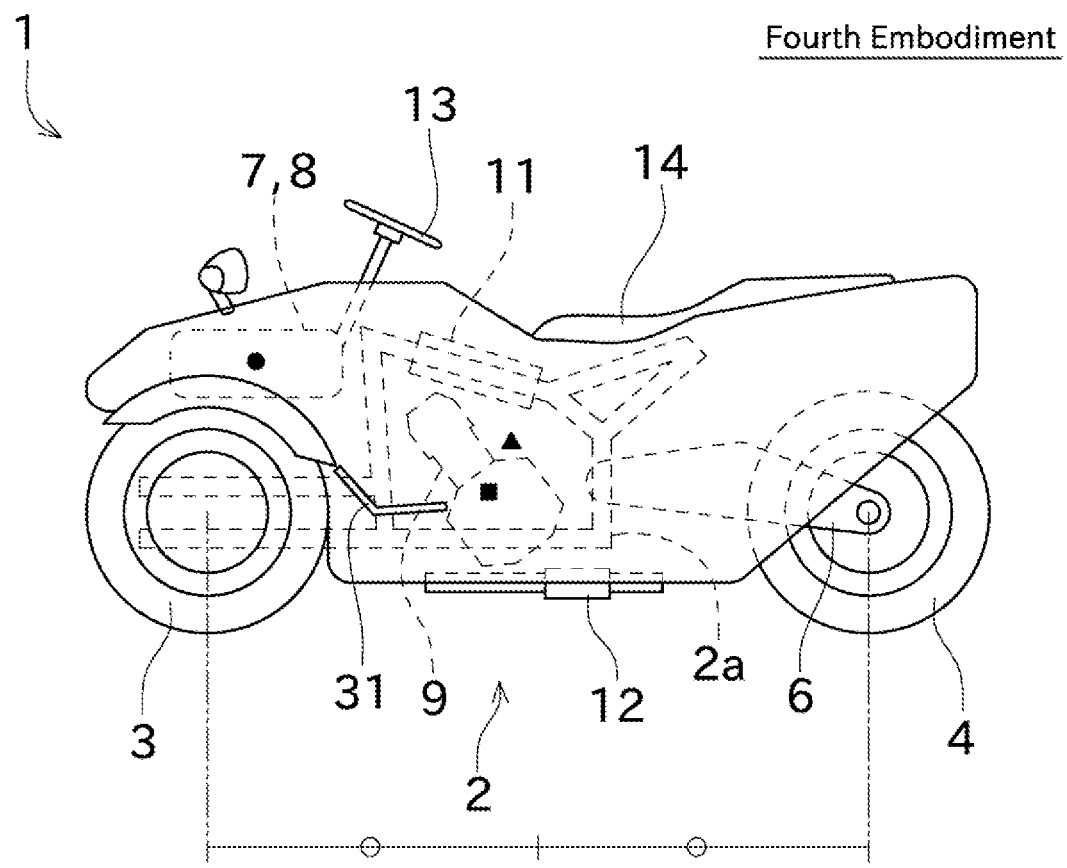
FIG. 5 is a side view of a fourth embodiment of the straddle vehicle.
Figure 6:
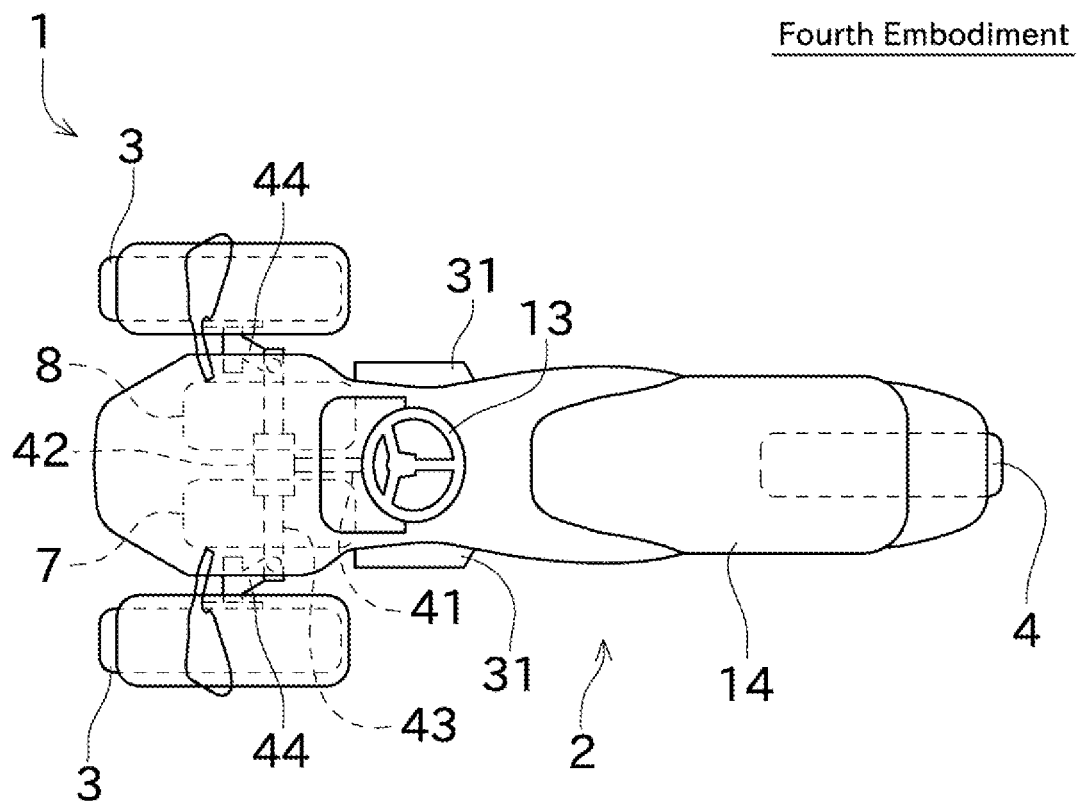
FIG. 6 is a plan view of the fourth embodiment of the straddle vehicle.

<Configuration of Fourth Embodiment> Next, the configuration of the straddle vehicle 1 of the fourth embodiment will be described with reference to FIGS. 5 and 6. FIG. 5 is a side view of the straddle vehicle 1 of the fourth embodiment. FIG. 6 is a plan view of the straddle vehicle 1 of the fourth embodiment.

The straddle vehicle 1 of the first embodiment to the third embodiment is a vehicle that has one front wheel 3 and one rear wheel 4. In contrast, the straddle vehicle 1 of the fourth embodiment is a vehicle that has two front wheels 3 and one rear wheel 4. The straddle vehicle 1 may be a vehicle with one front wheel 3 and two rear wheels 4, or may be a vehicle with two front wheels 3 and two rear wheels 4. In the description, a vehicle with two front wheels 3 refers to a vehicle in which the front wheels 3 are arranged symmetrically on the left and right sides with center position in the vehicle width direction as a line of symmetry. The same applies to vehicles with two rear wheels 4.

The straddle vehicle 1 of the fourth embodiment has a steering structure different from that of the above embodiments. Specifically, the straddle vehicle 1 of the fourth embodiment includes a steering handle 13 which is a wheel type. The straddle vehicle 1 includes a steering shaft 41, a steering gear box 42, a steering rod 43, and a pair of left and right knuckle arms 44, as a steering structure.

The steering force applied by the driver to the steering handle 13 is transmitted to the steering gear box 42 via the steering shaft 41. The steering gear box 42 amplifies the rotational movement of the steering shaft 41. By transmitting the rotational movement of the steering shaft 41, the steering rod 43 reciprocates. As a result, the knuckle arm 44 fixed to the tip of the steering rod 43 applies force to the front wheel 3 to change the direction of the front wheel 3.

Next, the layout of the first tank 7 and the second tank 8 will be mainly described with reference to the straddle vehicles 1 of the first embodiment to the fourth embodiment. In the following description, the first tank 7 and the second tank 8 will be collectively referred to as "tanks 7, 8." In the following explanation, the wording "parallel" includes not only a state where two straight lines are strictly parallel, but also a state where two straight lines are substantially parallel, in other words, approximately parallel. The same applies not only to "parallel" but also to wordings such as "perpendicular" or "coincidence" or the like.

<Direction and alignment of tanks> First, the directions of the tanks 7, 8 will be described. Since the tanks 7, 8 of the above embodiments have a cylindrical shape, the central axis of the cylinder is referred to as the axis of the tanks 7, 8. In addition, when the tanks 7, 8 are not cylindrical, the line passing through the center position of the cross section perpendicular to the longitudinal direction of the tanks 7, 8 corresponds to the axis of the tanks 7, 8. In the first to fourth embodiments, the axis of the first tank 7 and the axis of the second tank 8 are parallel.

In the first and third embodiments, the axes of the tanks 7, 8 are parallel to the height direction, and the tanks 7, 8 are arranged side by side in the vehicle length direction. Thereby, the size of the tanks 7, 8 in the vehicle width direction can be reduced. When the tanks 7, 8 are arranged side by side in the vehicle length direction, they are arranged so that the entire tanks 7, 8 overlap when viewed in the vehicle length direction. However, it is not necessary that the tanks 7, 8 completely overlap when viewed in the vehicle length direction. The same applies when the tanks 7, 8 are arranged side by side in other directions.

In the second embodiment, the axes of the tanks 7, 8 are parallel to the height direction, and the tanks 7, 8 are arranged side by side in the vehicle width direction. Thereby, the size of the tanks 7, 8 in the vehicle length direction can be reduced. The axes of the tanks 7, 8 in the second embodiment are parallel to the longitudinal direction of the front fork 5, in other words, the axes are parallel to the steering axis direction. Thereby, the tanks 7, 8 can be arranged by effectively utilizing the shape of the space around the front fork 5.

That is, in the motorcycles like the first to third embodiments, the axes of the tanks 7, 8 are preferably parallel to the height direction. Specifically, it is preferable that the angles of the axes of the tanks 7, 8 is within an acute angle range formed by the height direction and the longitudinal direction of the front fork 5. Each of the features is particularly effective for motorcycles such as the first to third embodiments, but can also be applied to three wheel or four wheel vehicles such as the fourth embodiment.

In the first to third embodiments, the tanks 7, 8 are removable. Since the axes of the tanks 7, 8 are parallel to the height direction, it is suitable for attaching and detaching the tanks 7, 8. For example, since the tanks 7, 8 can be attached and detached using the space above the container 21, it is easy to attach and detach the tanks 7, 8 even when the space around the straddle vehicle 1 is narrow. The tanks 7, 8 can be attached in the container 21 using their own weight.

In the fourth embodiment, the axes of the tanks 7, 8 are parallel to the vehicle length direction, and the tanks 7, 8 are arranged side by side in the vehicle width direction. Thereby, the size of the tanks 7, 8 in the height direction can be reduced. Since two front wheels 3 are arranged in the straddle vehicle 1 of the fourth embodiment, the requirement to reduce the size in the vehicle width direction is not as strong as in a two wheel vehicle. Therefore, the layout of the tanks 7, 8 of the fourth embodiment is particularly effective for a three-wheeled or four-wheeled vehicle like the fourth embodiment. The layout of the tanks 7, 8 of the fourth embodiment can also be applied to a two wheel vehicle.

In the first to fourth embodiments, the axes of the tanks 7, 8 are perpendicular to the vehicle width direction. Thereby, the size in the vehicle width direction can be reduced compared to the vehicle in which the axes of the tanks 7, 8 are parallel to the vehicle width direction.

The direction and alignment of the tanks 7, 8 described above are merely examples, and may be changed as follows. For example, the axes of the tanks 7, 8 may be parallel to the vehicle length direction, and the tanks 7, 8 may be arranged side by side in the height direction. Alternatively, the axes of the tanks 7, 8 may be parallel to the vehicle width direction, and the tanks 7, 8 may be arranged side by side in the vehicle length direction or height direction. The axes of the tanks 7, 8 may not be parallel. For example, the axes of the tanks 7, 8 may be arranged in a V-shape when viewed from the front. When three or more tanks are arranged, all the tanks may be arranged along one line, or may be arranged along two lines.

<front-rear positions of tanks> The front-rear positions of the tanks 7, 8 will be described. The following explanation focuses only on the positional relationship of the target members in the vehicle length direction, and does not consider the positional relationship in the height direction or vehicle width direction. Moreover, the center of gravity of the tanks 7, 8 does not refer to the individual center of gravity of the two tanks 7, 8, but refers to the center of gravity when the two tanks 7, 8 are considered as one component.

As mentioned above, the tanks 7, 8 are heavy objects. In the first to fourth embodiments, by arranging the tanks 7, 8 relatively forward, the vertical load of the front wheel 3, which is steering wheel, is increased. This improves steering performance. Specifically, the center of gravity of the tanks 7, 8 is located forward of the center of gravity of the vehicle. The centers of gravity of the tanks 7 and 8 are located forward of the center of gravity of the internal combustion engine 9. In some embodiments, the rear end of each of the tanks 7, 8 is located further forward than the front end of the internal combustion engine 9. The center of gravity of the tanks 7, 8 is located in the front region of the region bisecting the space between the front wheels 3 and the rear wheels 4. In other words, the center of gravity of the tanks 7, 8 is located behind the front wheels 3. The center of gravity of the tanks 7, 8 is located forward of the seat 14. Specifically, the rear ends of the tanks 7, 8 are located forward of the front end of the seat 14.

In the second and fourth embodiments, the range occupied by the front wheel 3 and the range occupied by the tanks 7, 8 overlap in the vehicle length direction.

In the above explanation, the wordings "front" or "forward" can also be reffed as "side where the steering wheel is located". The above-mentioned features are individual features, and even if only one of the positional relationships is executed, the effect that the tanks 7, 8 are located near the steering wheel can be achieved. Alternatively, any of the above positional relationships may be combined. Thereby, the effect that the tanks 7, 8 are located near the steering wheel can be further utilized.

When the straddle vehicle 1 includes the front fork 5 as in the first to third embodiments, the center of gravity of the tanks 7, 8 is located at the rear of the front fork 5. The tanks 7, 8 do not overlap the front fork 5 in the side view of the straddle vehicle. However, for example, when the tanks 7, 8 are arranged in the vehicle width direction, the tanks 7, 8 and the front fork 5 may overlap in the side view of the straddle vehicle. The center of gravity of the tanks 7, 8 may be located behind the steering handle 13 as in the first embodiment. The center of gravity of the tanks 7, 8 may overlap the steering handle 13 in the front rear direction as in the second and third embodiment. The centers of gravity of the tanks 7, 8 may be located in front of the steering handle 13 as in the fourth embodiment.

<Upper-lower positions of tanks> The upper-lower positions of the tanks 7 and 8 will be described. The following explanation focuses only on the positional relationship of the target members in the height direction, and does not consider the positional relationship in the vehicle length direction or the vehicle width direction.

Since the tanks 7, 8 and the internal combustion engine 9 are large, it is difficult to arrange both the tanks 7, 8 and the internal combustion engine 9 in the lower region of the straddle vehicle 1 from an aspect of space. Therefore, it is preferable that the center of gravity of the tanks 7, 8 and the center of gravity of the internal combustion engine 9 are located at different positions in the height direction. Generally, the internal combustion engine 9 is heavier than the tanks 7, 8, so it is preferable to arrange the internal combustion engine 9 at a lower position from an aspect of vehicle stability. When the tanks 7, 8 are arranged at a higher position, it is easier to attach and detach the tanks 7, 8. Even if it is not necessary to attach or detach the tanks 7, 8, it is easier to refuel the gaseous fuel when the tanks 7, 8 are placed at a higher position. For above the reason, in each embodiment, the center of gravity of the tanks 7, 8 is located higher than the center of gravity of the internal combustion engine 9.

The positional relationships in the height direction between the tanks 7, 8 and parts other than the internal combustion engine 9 is as follows. The center of gravity of the tanks 7, 8 is located higher than the center of gravity of the vehicle. The center of gravity of the tanks 7, 8 is located higher than the axle positions of the front wheel 3 or the rear wheel 4. In embodiments other than the fourth embodiment, the center of gravity of the tanks 7, 8 is located higher than the intake structure 11. The center of gravity of the tanks 7, 8 is located higher than the exhaust structure 12. The center of gravity of the tanks 7, 8 is located higher than at least one of the mounting 22, the pressure reducing valve 23, and the shut-off valve 24.

In the height direction, the range occupied by the front wheel 3 overlaps the range occupied by the tanks 7, 8.

In the sports type lean vehicle like the straddle vehicle of the first embodiment, steering performance is especially important. In order to improve the steering performance, it is preferable that the center of gravity of the vehicle is close to the imaginary line 100 shown in FIG. 1. The imaginary line 100 is a perpendicular line drawn from the ground surface of the rear wheel 4 to the front fork 5 when viewed the vehicle from the side. In the first embodiment, the center of gravity of the tanks 7, 8 is arranged at a position higher than the imaginary line 100, and the internal combustion engine 9 is arranged at a position lower than the imaginary line 100. By distributing and arranging heavy objects above and below the imaginary line 100 in this manner, the center of gravity of the vehicle can be close to the imaginary line 100.

The arbitrary positional relationship of the tanks 7, 8 in the vehicle length direction described above and the arbitrary positional relationship of the tanks 7, 8 in the upper/lower direction can also be combined. For example, in the fourth embodiment, the range occupied by the front wheel 3 overlap the range occupied by the tanks 7, 8 in both of the vehicle length direction and the height direction. Thereby, the tanks 7, 8 are arranged in the space between the left front wheel 3 and the right front wheel 3. The wording "the tanks 7, 8 are arranged in the space" means that the tanks 7, 8 are located in at least a part of the space. The tanks 7, 8 may be located above the space between the left front wheel 3 and the right front wheel 3.

<Other Layouts of Tanks> In the first to third embodiments, when a pair of left and right frames 2a are provided, the tanks 7, 8 are arranged between the left and right frames 2a. As shown in FIG. 2, the tanks 7, 8 are arranged inside the range occupied by the seat 14 in the vehicle width direction. In the fourth embodiment, the tanks 7, 8 are separately arranged so that the tanks 7, 8 sandwich the steering shaft 41 in the left-right direction.

<Layout of Regulating Valve> The pressure reducing valve 23 or the shut-off valve 24 is referred to as a "regulating valve" below. In this embodiments, the supply ports of the tanks 7, 8 are located on the lower side of the tanks 7, 8. In the first to third embodiments, the regulating valve is arranged at a position lower than the center of gravity of the tanks 7, 8, more specifically, at a position lower than the upper ends of the tanks 7, 8. Thereby, the gaseous fuel supply route can be shortened.

In the first embodiment, the tanks 7, 8 are arranged side by side in the vehicle length direction so as to pass through the center position in the vehicle width direction. The pressure reducing valve 23 and the shut-off valve 24 are arranged side by side in the vehicle width direction so that the valves sandwiches the center position in the vehicle width direction. Thereby, the tanks 7, 8, the pressure reducing valve 23, and the shut-off valve 24 can be arranged compactly. In the first embodiment, the regulating valve is arranged in a space between the tanks 7, 8 and the intake structure 11 when viewed from the side of the straddle vehicle 1. Thereby, the gaseous fuel supply route can be shortened. In the first embodiment, the regulating valve is arranged in a range that overlaps with the internal combustion engine 9 in the vehicle length direction.

In the second embodiment, the tanks 7, 8 are arranged side by side in the vehicle width direction. Therefore, a long space in the vehicle length direction excites behind the tanks 7, 8. The regulating valve of the second embodiment is arranged side by side in the vehicle length direction in a space behind the tanks 7, 8. In the second embodiment, the regulating valve is arranged at a position forward of the internal combustion engine 9 in the vehicle length direction.

In the third embodiment, the tanks 7, 8 are arranged side by side in the vehicle length direction. Therefore, a large space cannot excite behind the tanks 7, 8. Therefore, the regulating valve of the third embodiment is arranged side by side in the vehicle length direction in the space below the tanks 7, 8. In the third embodiment, the regulating valve is arranged at a position forward of the internal combustion engine 9 in the vehicle length direction.

<Layout of Internal Combustion Engine and Intake/Exhaust Structure> As described above, the front wheel 3 and the rear wheel 4 are arranged to have a space in the vehicle length direction. The center of gravity of the internal combustion engine 9 is located between the front wheel 3 and the rear wheel 4 in the vehicle length direction. The direction of the internal combustion engine 9 is various. In the first embodiment, the internal combustion engine 9 is arranged so that the axial direction of the cylinder is coincident with or facing to the vehicle length direction. Thereby, the range occupied by the internal combustion engine 9 in the height direction can be reduced. As a result, the tanks 7, 8 can be arranged at positions overlapping the internal combustion engine 9 in the vehicle length direction while the axes of the tanks 7, 8 is parallel to the height direction. In the second to fourth embodiments, the internal combustion engine 9 is arranged so that the axial direction of the cylinder is coincident with/facing to a diagonal direction when viewed from the side of the vehicle. The internal combustion engine 9 may be arranged so that the axial direction of the cylinder is coincident with/facing to the height direction.

As mentioned above, the center of gravity of the tanks 7, 8 is located higher than the center of gravity of the internal combustion engine 9. Therefore, gaseous fuel is supplied from above the internal combustion engine 9. The intake structure 11 is located at a higher position than the center of gravity of the internal combustion engine 9. As described above, gaseous fuel is supplied to the internal combustion engine 9 from top to bottom. Taking this point into consideration, the intake structure 11 is arranged at a position higher than the center of gravity of the internal combustion engine 9. On the other hand, the exhaust structure 12 is arranged at a relatively low position in the vehicle due to the position of the exhaust pipe. Specifically, it is arranged at a position lower than the center of gravity of the internal combustion engine 9. In another aspect, the exhaust structure 12 is located further away from the tanks 7, 8 than the intake structure 11. Therefore, the intake/exhaust paths can be shortened.

(Feature 1) As explained above, the straddle vehicle 1 of the above embodiments includes the front wheel 3, the rear wheel 4, the tanks 7, 8, the internal combustion engine 9, the seat 14, and the steering handle 13. The front wheel 3 is steering wheel. The rear wheel 4 is a drive wheel arranged located rearward of the front wheel 3. Tanks 7, 8 are filled with gaseous fuel. The internal combustion engine 9 generates power using gaseous fuel filled in tanks 7, 8. The driver sits on the seat 14. The driver perform the steering operation to the steering handle 13. The center of gravity of the tanks 7, 8 is located closer to the steering wheel with respect to the center of gravity of the internal combustion engine 9.

Thereby, the loads of the tanks 7, 8 are easily applied to the steering wheel, so the vertical load of the steering wheel can be increased and steering performance can be improved.

(Feature 2) In the straddle vehicle 1 of the embodiments, the center of gravity of the internal combustion engine 9 is located lower than the center of gravity of the tanks 7, 8.

Accordingly, the internal combustion engine 9, which is generally heavier than the tanks 7, 8, is placed at a lower position than the tanks 7, 8. As a result, the center of gravity of the straddle vehicle 1 becomes lower, so that the stability of the straddle vehicle 1 can be improved.

(Feature 3) The straddle vehicle 1 of the embodiments includes the intake structure 11 that is arranged at a position higher than the center of gravity of the internal combustion engine 9. Intake air supplied to the internal combustion engine 9 passes through the intake structure 11.

The tanks 7, 8 and the intake structure 11 which are members on the intake side can be arranged together at a position higher than the center of gravity of the internal combustion engine 9.

(Feature 4) The straddle vehicle 1 of the embodiments includes the exhaust structure 12 that is arranged at a position farther from the tanks 7, 8 than the intake structure 11. Exhaust gas discharged from the internal combustion engine 9 passes through the exhaust structure 12. The exhaust structure 12, which is a heat generating part, can be moved away from the tanks 7, 8. This makes it possible to suppress the temperature rise around the tanks 7, 8.

(Feature 5) The straddle vehicle 1 of the embodiments includes the regulating valve that reduces or shuts off the gaseous fuel supplied from the tanks 7, 8 to the internal combustion engine 9. The regulating valve is the pressure reducing valve 23 or the shut-off valve 24. The regulating valve is arranged at a position lower than the upper ends of the tanks 7, 8.

The tanks 7, 8 can protect the regulating valve. For example, when the internal combustion engine 9 is arranged below the tanks 7, 8, the regulating valve can be arranged between the tanks 7, 8 and the internal combustion engine 9, so that the fuel supply path can be shortened.

(Feature 6) The straddle vehicle 1 of the embodiments includes the container 21 that accommodates the tanks 7, 8. The tanks 7, 8 are attachable and detachable to the container 21. This makes it possible to easily fill the tanks 7, 8 with gaseous fuel.

(Feature 7) The straddle vehicle 1 of the embodiments includes the first tank 7 and the second tank 8. The axis of the first tank 7 and the axis of the second tank 8 are parallel. The first tank 7 and the second tank 8 are arranged so that their axes are aligned in a predetermined direction.

Thereby, the range in the specific direction occupied by the first tank 7 and the second tank 8 can be reduced. For example, the axes of the first tank 7 and the second tank 8 are parallel to the height direction, and the axes of the first tank 7 and the second tank 8 are aligned in the vehicle width direction. The size occupied by the first tank 7 and the second tank 8 in the vehicle length direction can be reduced. Alternatively, for example, the axes of the first tank 7 and the second tank 8 are along (coincident with) the vehicle length direction, and the axes of the first tank 7 and the second tank 8 are aligned in the vehicle width direction. The size occupied by the first tank 7 and the second tank 8 in the height direction can be reduced.

(Feature 8) In the straddle vehicle 1 of the embodiments, the axes of the tanks 7, 8 extend in a direction perpendicular to the vehicle width direction. Specifically, the axes of the tanks 7, 8 extend in the height direction or vehicle length direction.

By arranging the tanks 7, 8 in the above-mentioned directions, the range occupied by the tanks 7, 8 is less likely to extend across the width of the vehicle.

(Feature 9) The straddle vehicle 1 of the embodiments includes the front fork 5 to which the front wheel 3 is rotatably attached. The tanks 7, 8 are arranged rearward of the front fork 5 in a side view.

The size of the straddle vehicle in the vehicle width direction can be reduced compared to a vehicle in which the front fork 5 and the tanks 7, 8 are arranged so as to overlap in a side view. The tanks 7, 8 can be protected by the front fork 5 compared to the vehicle in which the tanks 7, 8 are arranged in front of the front fork 5.

(Feature 10) In the straddle vehicle 1 of the embodiments, the front wheels 3 or the rear wheels 4 include the left wheel and the right wheel that are arranged as a pair of left and right wheels with an interval between them. Tanks 7, 8 are arranged in the space between or above the left wheel and the right wheel.

Thereby, the tanks 7, 8 can be arranged by utilizing the space between the two front wheels 3 or between the two rear wheels 4.

Features 1 to 10 described above can be combined as appropriate unless a contradiction occurs. For example, feature N (N=1, 2, . . . , 10) can be appropriately combined with at least one of feature 1 to feature N−1.

Although the preferred embodiment of the present disclosure has been described above, the above configuration can be modified as follows, for example.

The straddle vehicle 1 may be a series type hybrid vehicle. That is, in the straddle vehicle 1, the internal combustion engine 9 generates power, a generator is driven by the power to generate electric power and to charge the battery. In the straddle vehicle 1, a motor is driven by the electrical energy stored in the battery, and drive wheel is driven by the power of the motor.

The invention claimed is:

1. A straddle vehicle, comprising:
a front wheel configured as a steering wheel;
a rear wheel configured as a drive wheel located rearward of the front wheel;
at least one tank configured to be filled with a gaseous fuel;
an internal combustion engine configured to generate power using the gaseous fuel filled in the at least one tank;
a seat for a driver of the vehicle; and
a steering handle configured to allow the driver to perform a steering operation,
wherein a center of gravity of the at least one tank is located closer to the steering wheel than a center of gravity of the internal combustion engine; and
wherein the center of gravity of the internal combustion engine is lower than the center of gravity of the at least one tank.

2. The straddle vehicle according to claim 1, further comprising:
an intake structure located higher than the center of gravity of the internal combustion engine and through which intake air supplied to the internal combustion engine passes.

3. The saddle vehicle according to claim 2, further comprising:
an exhaust structure located further from the at least one tank than the intake structure and through which exhaust air exhausted from the internal combustion engine passes.

4. The straddle vehicle according to claim 1, further comprising:
a regulating valve configured to reduce or shut off the gaseous fuel supplied from the at least one tank to the internal combustion engine,
wherein the regulating valve is located lower than an upper end of the at least one tank.

5. The straddle vehicle according to claim 1, further comprising:
a container configured to accommodate the at least one tank, wherein the at least one tank is attachable and detachable to the container.

6. The straddle vehicle according to claim 1, wherein the at least one tank includes a first tank and a second tank, wherein axes of the first tank and the second tank are parallel, and wherein the first tank and the second tank are arranged such that the axes of the first tank and the second tank are aligned in a predetermined direction.

7. The straddle vehicle according to claim 1, wherein an axis of the at least one tank extends in a direction perpendicular to a width of the vehicle.

8. The straddle vehicle according to claim 1, further comprising:
a front fork,
wherein the front wheel is rotatably attached to the front fork, and
wherein the at least one tank is located rearward of the front fork in a side view.

9. The straddle vehicle according to claim 1, wherein the front wheel or the rear wheel comprises a left wheel and a right wheel which are arranged as a pair of left and right with an interval between them, wherein the at least one tank is arranged in a space between or above the left wheel and the right wheel, and wherein at least a part of the at least one tank is located between the left and right wheels in the top view.

10. The straddle vehicle according to claim 1, wherein the center of gravity of the at least one tank is located over an imaginary line which is a perpendicular line drawn from a ground surface of a rear wheel to a front fork in a side view.

11. The straddle vehicle according to claim 1, wherein the center of gravity of the internal combustion engine is closer to an imaginary line which is a perpendicular line drawn from a ground surface of a rear wheel to a front fork in a side view than the center of gravity of the at least one tank.

12. The straddle vehicle according to claim 1, wherein the internal combustion engine and a swing arm are connected via separate component and wherein the center of gravity of the at least one tank is over a center of gravity of a vehicle body and the center of gravity of the internal combustion engine is under the center of gravity of the vehicle body.

* * * * *